United States Patent
Goh et al.

(10) Patent No.: US 9,047,579 B2
(45) Date of Patent: Jun. 2, 2015

(54) ADVANCED MATERIAL TRACKING SYSTEM (AMTS)

(75) Inventors: Hack Meng Goh, Singapore (SG); Ai Lee Lim, Singapore (SG)

(73) Assignee: Seagate Technology LLC, Cuperino, CA (US)

( * ) Notice: Subject to any disclaimer, the term of this patent is extended or adjusted under 35 U.S.C. 154(b) by 1768 days.

(21) Appl. No.: 12/104,990

(22) Filed: Apr. 17, 2008

(65) Prior Publication Data
US 2009/0261165 A1     Oct. 22, 2009

(51) Int. Cl.
| | | |
|---|---|---|
| *G06Q 20/00* | (2012.01) | |
| *G06G 1/14* | (2006.01) | |
| *G06Q 10/00* | (2012.01) | |
| *G06F 17/00* | (2006.01) | |
| *G06F 19/00* | (2011.01) | |
| *G06Q 30/00* | (2012.01) | |
| *G06Q 90/00* | (2006.01) | |
| *G06Q 10/08* | (2012.01) | |
| *G06Q 10/06* | (2012.01) | |
| *G06Q 20/20* | (2012.01) | |

(52) U.S. Cl.
CPC ............. *G06Q 10/087* (2013.01); *G06Q 10/08* (2013.01); *G06Q 10/06* (2013.01); *G06Q 20/203* (2013.01)

(58) Field of Classification Search
CPC ...... G06Q 10/087; G06Q 10/08; G06Q 10/06; G06Q 20/203
USPC ...................................... 235/385; 705/22, 28
See application file for complete search history.

(56) References Cited

U.S. PATENT DOCUMENTS

| | | | | |
|---|---|---|---|---|
| 4,530,067 | A | * | 7/1985 | Dorr ................................. 705/15 |
| 5,063,507 | A | * | 11/1991 | Lindsey et al. .................. 705/37 |
| 5,319,544 | A | | 6/1994 | Schmerer et al. |
| 5,644,725 | A | | 7/1997 | Schmerer |
| 5,962,834 | A | * | 10/1999 | Markman ...................... 235/385 |
| 6,182,053 | B1 | * | 1/2001 | Rauber et al. .................... 705/28 |
| 7,400,268 | B2 | * | 7/2008 | Wilbrink et al. ............... 340/933 |
| 7,669,763 | B2 | * | 3/2010 | Ernesti et al. .................. 235/385 |
| 7,770,792 | B2 | * | 8/2010 | Bruns et al. .................... 235/385 |
| 8,311,905 | B1 | * | 11/2012 | Campbell et al. ................ 705/28 |
| 8,538,837 | B2 | * | 9/2013 | Fan et al. ......................... 705/28 |
| 2001/0004734 | A1 | * | 6/2001 | Kudoh et al. .................... 705/26 |
| 2002/0022983 | A1 | * | 2/2002 | Barton ............................... 705/7 |
| 2002/0103709 | A1 | * | 8/2002 | Anthony et al. ................. 705/22 |
| 2002/0123814 | A1 | * | 9/2002 | Bickley et al. .................. 700/99 |
| 2003/0083964 | A1 | * | 5/2003 | Horwitz et al. ................. 705/28 |
| 2003/0094493 | A1 | * | 5/2003 | Guerrero et al. ......... 235/462.01 |
| 2003/0233271 | A1 | * | 12/2003 | Bamberg et al. ................ 705/10 |
| 2004/0024644 | A1 | * | 2/2004 | Gui et al. ......................... 705/22 |
| 2004/0024730 | A1 | * | 2/2004 | Brown et al. ..................... 707/1 |
| 2004/0084526 | A1 | * | 5/2004 | Knowles et al. ............... 235/385 |
| 2004/0162889 | A1 | * | 8/2004 | Morris et al. .................. 709/217 |

(Continued)

*Primary Examiner* — Daniel Walsh
(74) *Attorney, Agent, or Firm* — Hall Estill Attorneys at Law

(57) ABSTRACT

A method for tracking and reporting material movements and responding to material movements. Tracked-components are assigned a component identifier which can be associated with a location. The identifier is associated with a first location, and in response to a movement trigger, the location associated with the identifier is updated to a second location. A component can be comprised of multiple sub-components, each of which itself is a tracked component. When the location of the component is updated, the location of each sub-component is similarly updated. Each update of the location of a component can trigger reports or other actions within the system.

22 Claims, 3 Drawing Sheets

(56) References Cited

U.S. PATENT DOCUMENTS

| | | | |
|---|---|---|---|
| 2004/0205343 A1* | 10/2004 | Forth et al. | 713/168 |
| 2004/0215480 A1* | 10/2004 | Kadaba | 705/1 |
| 2004/0243485 A1* | 12/2004 | Borenstein et al. | 705/27 |
| 2005/0038710 A1* | 2/2005 | Zimmerman et al. | 705/26 |
| 2005/0049914 A1* | 3/2005 | Parish | 705/14 |
| 2005/0075891 A1* | 4/2005 | Arguimbau, III | 705/1 |
| 2005/0125325 A1* | 6/2005 | Chai et al. | 705/35 |
| 2005/0131645 A1* | 6/2005 | Panopoulos | 701/214 |
| 2005/0156035 A1* | 7/2005 | Gyi et al. | 235/385 |
| 2005/0171856 A1* | 8/2005 | Takahashi et al. | 705/26 |
| 2005/0199707 A1* | 9/2005 | Beck et al. | 235/380 |
| 2005/0284934 A1* | 12/2005 | Ernesti et al. | 235/385 |
| 2005/0289020 A1* | 12/2005 | Bruns et al. | 705/28 |
| 2006/0265286 A1* | 11/2006 | Evangelist et al. | 705/22 |
| 2006/0277059 A1* | 12/2006 | J'maev et al. | 705/1 |
| 2006/0282340 A1* | 12/2006 | Morand et al. | 705/28 |
| 2007/0005438 A1* | 1/2007 | Evangelist et al. | 705/26 |
| 2007/0005459 A1* | 1/2007 | Fowler | 705/28 |
| 2007/0114279 A1* | 5/2007 | Lessing et al. | 235/385 |
| 2007/0156543 A1* | 7/2007 | Klim et al. | 705/28 |
| 2007/0198357 A1* | 8/2007 | Ravazzolo | 705/23 |
| 2008/0035727 A1* | 2/2008 | Stanzel et al. | 235/385 |
| 2008/0319770 A1* | 12/2008 | Guldner et al. | 705/1 |
| 2009/0261165 A1* | 10/2009 | Goh et al. | 235/385 |
| 2010/0179853 A1* | 7/2010 | Garcia et al. | 705/9 |
| 2010/0262453 A1* | 10/2010 | Robinson et al. | 705/9 |
| 2011/0029412 A1* | 2/2011 | Laughlin et al. | 705/28 |
| 2011/0035297 A1* | 2/2011 | Chao | 705/27.1 |
| 2011/0050397 A1* | 3/2011 | Cova | 340/10.1 |
| 2012/0173392 A1* | 7/2012 | Kirby et al. | 705/28 |
| 2013/0080277 A1* | 3/2013 | Evans | 705/22 |
| 2013/0233922 A1* | 9/2013 | Schoening et al. | 235/385 |
| 2014/0279664 A1* | 9/2014 | Lievens et al. | 705/339 |
| 2014/0279668 A1* | 9/2014 | Lievens et al. | 705/340 |

* cited by examiner

ADVANCED MATERIAL TRACKING SYSTEM (AMTS)

BACKGROUND OF THE INVENTION

The monitoring and verification of inventory is a necessity in a wide variety of industries. Virtually every manufacturer who stores his goods in a warehouse, factory, or assembly plant for any period of time must monitor and verify the type and quantity of goods in inventory. This process is not limited to those who make their own products. For instance, where a softdrink company uses outside bottlers to manufacture its product, the softdrink company must periodically visit the bottler to establish raw material usage and actual finished product inventory. Still further, finance companies who rely on the goods in the possession of a dealer as collateral must frequently establish the location and condition of such goods.

Typically, the inventory is performed from an Inspection Checklist which is produced by computers. In many cases, checklists are prepared periodically, so the status at any given moment can only be determined as recently as the completion of the most recent checklist. Furthermore, a checklist may be as many as 7 to 10 days old at the beginning of the inventory.

When the physical inventory is complete, all items not found, which have not been paid off, are noted. These items require reconciliation with the dealer's records. In many audits the list of items is so large that the auditor must spend a significant amount of time reviewing the items on the checklist to ensure that all applicable items are reconciled with the dealer.

Frequently, the reconciliation process requires more time than the physical inventory. Because of the intense concentration involved, the size of the inventory and the number of handwritten comments and codes, items that have already been sold may be missed by the auditor. In such situations, no collection is made for these items and the finance company is subject to financial loss.

The problem of tracking and accounting for inventory is increased in factory and assembly settings where parts are not always maintained in individual or separate form. As parts are used to form assemblies, the individual raw components are more difficult to track. Further paper inventories do not lend themselves to tracking rates of consumption and automatic generation of bills of material.

What is needed in the art is a way to provide the traceability of a product and efficient factory operation. This is particularly important in the production of medical devices and computer mass storage devices. Further, there is a need for more efficient auditing and verification of component usage in production of finished goods.

SUMMARY OF THE INVENTION

The present invention relates to a method of tracking and reporting material movements. Each tracked-component is assigned a component identifier which can be associated with a location. The identifier is associated with a first location, and in response to a movement trigger, the location associated with the identifier is updated to a second location.

In accordance with a further aspect of the present invention, a component is comprised of multiple sub-components, each of which is a tracked component. When the location of the component is updated, the location of each sub-component is similarly updated.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the views and in which.

DETAILED DESCRIPTION OF ILLUSTRATIVE EMBODIMENTS

The present invention relates generally to the monitoring and tracking the location of inventory materials and components, and more particularly, but not by limitation, to electronic data collection and transaction processing of inventory status and tracking.

With reference now to the Figures, the present invention provides a way to track and update the movements of inventory components, such as materials, parts, and assemblies, within and between locations.

Figure 1:
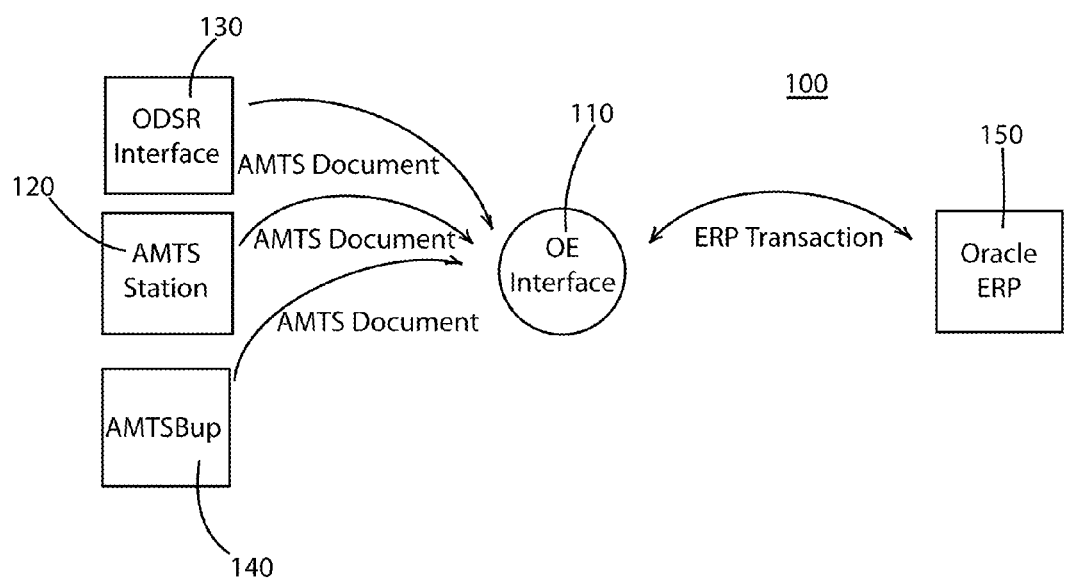
FIG. 1 illustrates and overview of the interconnectivity of a system in accordance with an embodiment of the present invention.

FIG. 1 illustrates that the various systems of an enterprise 100 can communicate such that a complete view of inventory can be presented through the Open Enterprise Interface ("OE Interface") 110. The OE Interface 110 enables validation of transaction information before submission to the Inventory System, synchronization of material status with Inventory system, and provides transaction status feedback to the Advanced Material Tracking system ("AMTS") Stations 120. The Disk Drive Shipping Request ("DDSR") Interface 130, Advanced Material Tracking system ("AMTS") Stations 120 and AMTSBup 140 (i.e., Advanced Material Tracking System Background Processes) can transmit AMTS documents (electronic or paper) to the OE interface 110.

The enterprise resource planning system ("ERP"), e.g., the ORACLE ERP, can communicate with the OE interface 110 by known methods to transmit enterprise resource planning messages back and forth. ERP messages include inventory transactions such as the transfer of material from various inventories, the issue of materials, the receipt of materials, completion of an assembly transaction, or the assembly return transaction. Each transaction submitted by the AMTS via the OE Interface 110 can be captured by the ERP. Once captured, the ERP can assign the transaction an initial status, which can be regularly updated. Thus, the AMTS can audit and archive transactions with reference to the status of the transactions submitted.

The system can receive input from various input methods known in the art. For example, when tracking a component, a component identifier may be scanned by entering information on a keypad, by scanning a barcode, or by exchanging information, actively or passively, with an RFID tag associated with component. The input of a component identifier can be used to record the departure or arrival of a component at a tracking station, assembly point, workstation, or at a physical facility.

Figure 2:
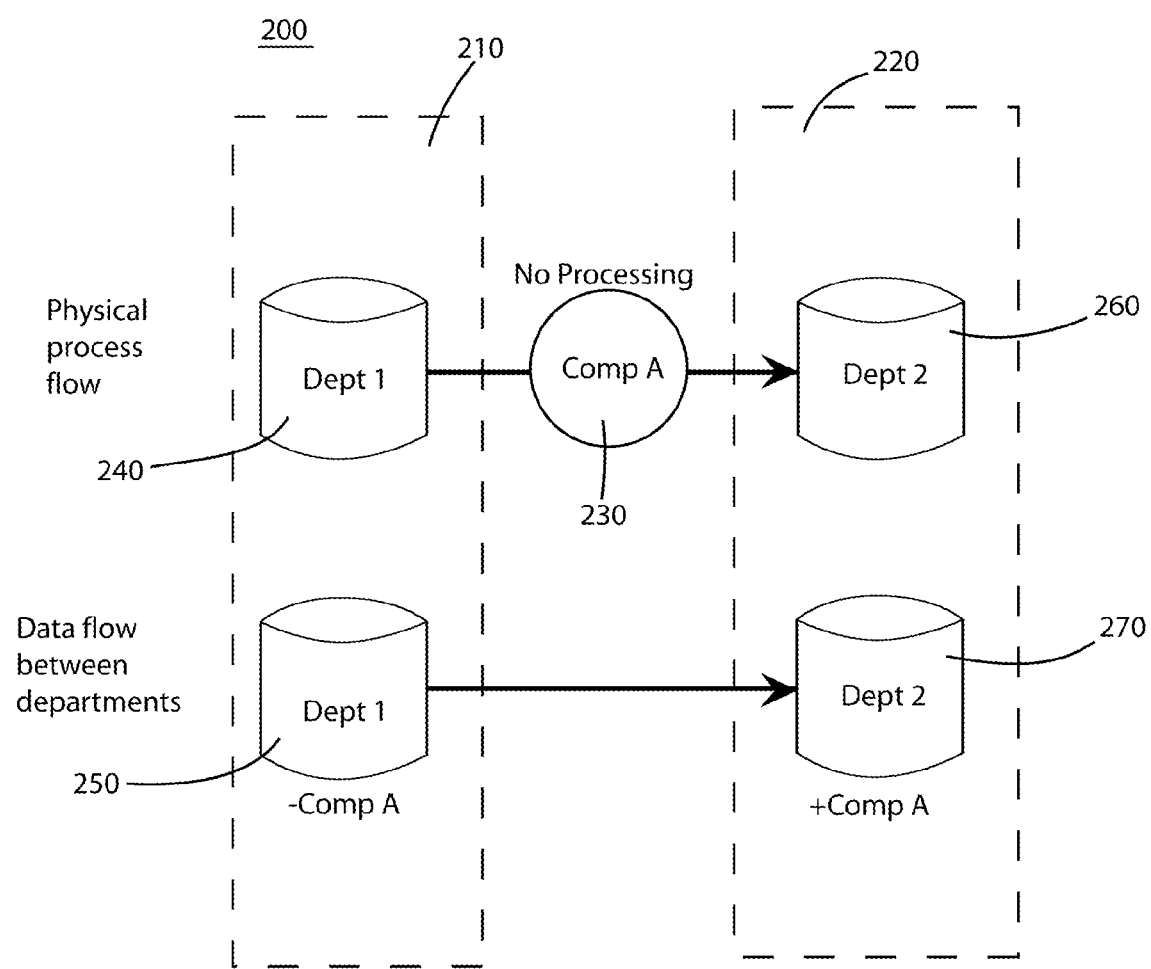
FIG. 2 illustrates the physical flow and corresponding data flow associated with the movement of a component in accordance with an embodiment of the present invention.

Additionally, a destination or origin can be recorded when the identifier is input. For example, FIG. 2 illustrates the movement of parts and information when a component 230 moves from an origin 210 (Department 1) to a destination 220 (Department 2). The physical component 230 moves from the inventory 240 of the origin 210 to the inventory 260 of the destination 220.

The component identifier of component 230 can be scanned at origin 210 to indicate it has left inventory 240. The database 250 at the origin 210 is then updated to indicate the component is no longer in inventory 240. Optionally, a destination 220 can be input along with the scanning of the component identifier. The destination can be recorded in database 250 to record where the component was supposed to go. Further, a message can be sent to the destination 220 to notify the destination that the component 230 should arrive.

The location of the component is preferably updated in response to a movement trigger. A movement trigger notifies the system that the component has moved and can include various inputs. For example, the movement trigger can include the manual input of a component identifier and a new location. Alternatively, the movement trigger can include the automated scanning (e.g., barcode scanning or RFID scanning) of the component at the new location. The scanning can be performed by a sensor at a known location. Thus, the location of the sensor, or a location associated with the sensor can be associated with the component as the new location.

The various locations and facilities can maintain separate databases each tracking its own inventory, including what components are on-site, where each component came from, or where each component was sent. The data can also be aggregated into one or more databases which maintain records for subsets or the entirety of the enterprise.

Alternatively, or in conjunction with scanning the component identifier at the origin, the component 230 can be scanned when it arrives at the destination 220. When the component 230 arrives at destination 220 and is added to inventory 260 its identifier is scanned and database 270 is updated to indicate that the component is now located at destination 220. The origin of the component 230 can also be recorded in the database 270. Further, database 250 can be updated to record that the component 230 arrived at the destination 220. If database 250 has not already recorded the departure of component 230, database 270 can communicate with database 250 to update the records at database 250 to indicate the components new location.

Optionally, the system can track and record all past locations of a component. This information would allow a user to follow the path of components during is lifecycle. This information can be maintained in the database or in a log. Further, an analysis of the path of the component 230 can assist in determining inefficiencies, bottlenecks, or redundancy in the assembly process.

Additional information concerning the movement of components can also be maintained in the database. For example, the timestamp of each scan can be recorded. If the component is transported by an individual, the name, employee number, or other identifier of the individual can be recorded. If the acceptance of the component requires authorization, the receiver can sign a computerized touch sensitive screen which captures and records the signature.

Figure 3:
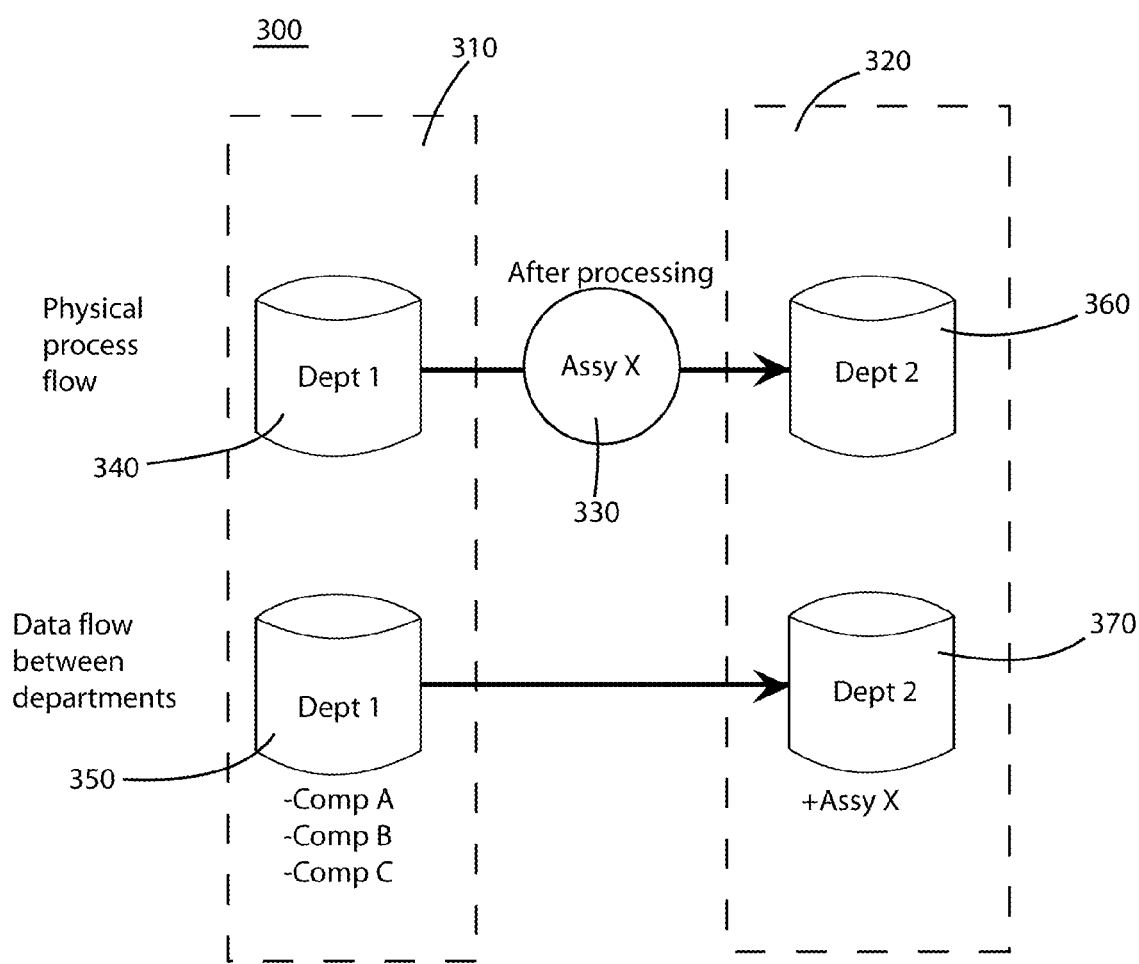
FIG. 3 illustrates the physical flow and corresponding data flow associated with the movement of an assembly in accordance with an embodiment of the present invention.

In accordance with a further feature of the present invention, FIG. 3 illustrates the physical flow and data flow resulting from the movement of an assembly. An assembly can include one or more components, which have been assembled or simply grouped for later shipment or assembly. An assembly is treated in a manner similar to a component and has its own identifier which can be scanned in the same manner as a component. If the assembly includes components which have been joined together (i.e., assembled) an identifier can be placed on the assembly itself. Alternatively, if the assembly is a collection of components, or it is preferred not to affix the identifier to the assembly, the identifier can be associated with the package, palette, tray, or bin, etc. in which the assembly is being transported.

For example, FIG. 3 illustrates the movement of Assembly X 330 from an origin inventory 340 at an origin 310 (e.g., Department 1) to a destination inventory 360 at a destination 320 (e.g., Department 2). When assembly 330 is moved, database 350 and database 370 are updated to reflect that the assembly has moved from one location to another, as discussed with respect to FIG. 2. Further, the database records associated with each component that is part of the assembly 330 can also be updated in the respective database. Thus, components can be tracked as part of assemblies through their entire lifecycle. Additionally, once a component is part of an assembly, the components do not need to be individually scanned, but can be tracked as the assembly is tracked.

When a component or an assembly is scanned, the AMTS document associated therewith can be automatically retrieved from the database and displayed on a screen or printed. The AMTS document can include all relevant data regarding the item scanned. If the scanned item is an assembly, the AMTS document can retrieve component identifiers and other information to ensure accuracy or verify component identification and information against the database and physical component. Optionally, the AMTS documents associated with each component can also be retrieved and similarly verified.

In an automated setting components and assemblies can be scanned automatically as they move through the system. For example, identifier tags associated with each component/assembly can be automatically scanned as they pass through a gate or checkpoint that is equipped with optical character recognition hardware and software, barcode readers, or RFID readers.

Automatic or manual scanning can trigger various transactions based on the movement of the components and assemblies. For example, AMTS documents can be automatically created, thus updating the inventory system with the latest inventory status. Packing lists, invoices, and bill-of-material information can also be automatically populated and generated in response to scanning.

It would be understood by one of ordinary skill in the art that location (i.e., origins and destinations) can include workstations within the same facility, or non-contiguous locations or buildings. Optionally, if components are being transferred between locations or buildings, the system includes security features that allow the components to be moved between with proper security tracking. For example, username/password or challenge/response authentication can be used to control access to various modules and functions the AMTS. Further, access to information within the AMTS can be restricted or allowed based on the privileges of the user or group(s) to which the user belongs. Users and groups can also be associated with specific locations (e.g., inventory locations) and only permitted to perform operations affecting the associated location (e.g., receive or transfer inventory at the associated location).

The system further provides access to the database information through a variety of methods. Raw database access can be had by users, preferably properly authorized. Alternatively, form-based access through a terminal of a World-Wide-Web page can provide varying levels of access depending on the location of the interface and authorization of the user. Preferably, an interface enables the user to track the entire path of a component. Additionally, the provided interfaces preferably provide a current location of a particular component identifier, or the location of all components of a particular type or assembly.

The above description is presented to enable a person skilled in the art to make and use the invention, and is provided in the context of a particular application and its requirements. The entire disclosure of the patents and publications referred in this application are hereby incorporated herein by reference. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. The implementations described above and other implementations are within the scope of the following claims.

We claim:

1. A method for enterprise resource planning, the method comprising:
   storing in computer memory a first inventory count for a component in an origin location and a second inventory count for the component in a destination location, the origin and destination locations being physically different locations;
   storing in computer memory an inventory transaction record for a selected one of the components that is physically located in the origin location, the inventory record assigning to the selected component a component identifier and the destination location;
   in response to the storing of the inventory transaction record, decrementing the first inventory count by the selected component and incrementing the second inventory count by the selected component; and
   after decrementing the first inventory count, physically moving the selected component out of the origin location.

2. The method of claim 1, wherein the assigning is characterized by at least one of the selected components being an assembly having multiple sub-components, at least one sub-component assigned one of the component identifiers.

3. The method of claim 2, wherein the updating is characterized by updating the location of the respective component identifier of at least one of the sub-components.

4. The method of claim 1, further comprising providing an interface for a user to view an inventory status of the selected-components.

5. The method of claim 1 wherein the updating is characterized by:
   modifying a database associated with the first location to indicate the component is not located at the first location; and
   modifying a database associated with the second location to indicate the component is located at the second location.

6. The method of claim 1 wherein the updating is characterized by recording a timestamp.

7. The method of claim 1, further comprising:
   generating a location log, the location log recording the first location and the second location associated with the particular component identifier; and
   analyzing component usage based on the location log.

8. The method of claim 7 wherein the analyzing is characterized by analyzing the movement of the selected components.

9. The method of claim 1, wherein the assigning is characterized by the component identifiers being scannable.

10. The method of claim 9 wherein the assigning is characterized by scanning the component identifier of the particular component when the particular component passes by a sensor.

11. A system comprising a computer readable memory encoded with instructions configured to:
    store in a computer a plurality of component identifiers with a current physcial location of a plurality of components at an origin location;
    store in the computer an inventory transaction record of a selected number of the plurality of component identifiers and a corresponding destination location for the selected number; and
    in response to storing the inventory transaction record and before physically moving at least one of the selected number from the origin location, decrementing a computer record indicating an inventory count of the components in the origin location.

12. The system of claim 11 wherein at least one of the components has a plurality of sub-components, at least one sub-component being assigned one of the plurality of component identifiers.

13. The system of claim 12 wherein at least one of the plurality of sub-components defines an assembly, the system further configured to update the location of the assembly and update the location of at least some of the sub-components of the assembly.

14. The system of claim 11 further configured to verify the component identifiers against a resource database.

15. The system of claim 11, wherein the moving includes automated scanning of the component identifiers.

16. The system of claim 11, further comprising an interface configured to present to an inventory status of the components.

17. The system of claim 11 further configured to modify a database associated with the origin location to indicate the component is not located at the origin location, and to modify a database associated with the destination location to indicate the component is located at the destination location.

18. The system of claim 11 further configured to record a timestamp associated with at least one of the location, the origin location, and the destination location.

19. The system of claim 11 further configured to generate a location log recording the origin location and the destination location.

20. The system of claim 19 further configured to analyze the particular component usage based on the location log and analyze the movement of the particular component based on the location log.

21. The system of claim 11, wherein the component identifiers are scannable.

22. A system comprising a computer readable memory encoded with instructions configured to:
    store in a computer a plurality of component identifiers with a current physical location of a plurality of components at an origin location;
    store in the computer an inventory transaction record of a selected number of the plurality of component identifiers and a corresponding destination location; and
    in response to storing the inventory transaction record and before physically moving at least one of the selected number from the origin location, incrementing a computer record indicating an inventory count of the components in the destination location.

* * * * *